US011487920B2

(12) United States Patent
Laverty et al.

(10) Patent No.: US 11,487,920 B2
(45) Date of Patent: Nov. 1, 2022

(54) GENERATING A DEBRIS MODEL FOR A STRUCTURE

(71) Applicant: The Boeing Company, Chicago, IL (US)

(72) Inventors: Richard Rion Laverty, Philadelphia, PA (US); Megan Elizabeth Prucnal, Wallingford, PA (US); Jonathan Wayne Gabrys, Downingtown, PA (US)

(73) Assignee: The Boeing Company, Chicago, IL (US)

( * ) Notice: Subject to any disclaimer, the term of this patent is extended or adjusted under 35 U.S.C. 154(b) by 582 days.

(21) Appl. No.: 16/281,627

(22) Filed: Feb. 21, 2019

(65) Prior Publication Data
US 2020/0272704 A1    Aug. 27, 2020

(51) Int. Cl.
  *G06F 30/23* (2020.01)
  *G06F 30/15* (2020.01)
  *G06F 111/10* (2020.01)

(52) U.S. Cl.
  CPC ............ *G06F 30/23* (2020.01); *G06F 30/15* (2020.01); *G06F 2111/10* (2020.01)

(58) Field of Classification Search
  CPC ....... G06F 2111/10; G06F 30/15; G06F 30/23
  See application file for complete search history.

(56) References Cited

U.S. PATENT DOCUMENTS

| 7,630,871 | B2 * | 12/2009 | Cole ...................... G06F 30/23 703/8 |
| 8,423,327 | B2 * | 4/2013 | Lacome .................. G01N 3/48 703/2 |
| 8,862,437 | B1 | 10/2014 | Rassaian et al. |
| 9,020,689 | B2 | 4/2015 | Smith et al. |
| 10,540,459 | B2 * | 1/2020 | McKennon-Kelly ... G06F 30/20 |
| 10,621,552 | B1 * | 4/2020 | Syed .................... G06Q 10/103 |
| 2009/0228246 | A1 * | 9/2009 | Lacome .................. G01N 3/48 703/2 |
| 2015/0347650 | A1 * | 12/2015 | Hallquist ................ G06F 30/15 703/2 |
| 2016/0023772 | A1 * | 1/2016 | Borigo ................. B64D 15/163 134/1 |
| 2018/0189428 | A1 * | 7/2018 | McKennon-Kelly ... G06F 30/20 |
| 2018/0285502 | A1 * | 10/2018 | Hallquist ................ G06F 30/23 |

OTHER PUBLICATIONS

Y. S. Kang, F. Sadeghi, M. R. Hoeprich, "A finite element model for spherical Debris Denting in Heavily Loaded Contacts", pp. 71-80, (Year: 2004).*

* cited by examiner

Primary Examiner — Kibrom K Gebresilassie
(74) Attorney, Agent, or Firm — Coats + Bennett, PLLC (57) ABSTRACT

A computer generates a computer model based on the output data of a finite element analysis (FEA) performed on a structure that has experienced a break up event. The output data is processed to generate a debris model. The debris model comprises data defining the structure, as well as any fragments or pieces of debris caused by forces exerted on the structure during the break up event. The debris model can then be utilized as input data to generate other computer models.

20 Claims, 11 Drawing Sheets

PROCESSING CIRCUITRY
112

FILE OBTAINING MODULE/UNIT
122

DEBRIS PART GENERATING MODULE/UNIT
124

ELEMENT CONNECTION MODULE/UNIT
126

DEBRIS PART MEASUREMENT MODULE/UNIT
128

IDENTIFIER ASSIGNING MODULE/UNIT
130

COMPUTER MODEL GENERATING MODULE/UNIT
132

OUTPUT MODULE/UNIT
134

GENERATING A DEBRIS MODEL FOR A STRUCTURE

STATEMENT OF GOVERNMENT RIGHTS

Aspects of the present disclosure were made in the performance of work under NASA Contract No. NNM07AB0C3 and is subject to the provisions of Section 305 of the National Aeronautics and Space Act of 1958 (72 Stat.435: 42 U.S.C.2457).

TECHNICAL FIELD

The present disclosure relates generally to computer devices, and particularly to computer devices configured to generate computer models based on data output as the result of a finite element analysis (FEA).

BACKGROUND

Finite element analysis (FEA), also referred to as the Finite Element Method (FEM), is an important computational technique used by engineers to determine the stress, strain, and displacement, etc., of the parts of a structure with complex loading. As many engineers will know, FEA is particularly beneficial for simulating dynamic events. Generally, with FEA, a 3-dimensional body is hypothetically partitioned into a plurality of "elements." Each element has a finite degree of freedom in which to move, and is connected to at least one other adjacent element at a plurality of "nodes." The complete set of interconnected elements is referred to as a "mesh."

Engineers have utilized a FEA, for example, when simulating the break-up of a structure to approximate the amount and distribution of the resulting debris fragments. Generally, an FEA is run one or more times, with each run producing a result approximating how a given structure might fragment into multiple pieces of debris given various different parameters. The engineers can then analyze the results output by the FEA, and based on that analysis, enhance various aspects of the design of a given structure, and/or determine whether any fragments of the structure pose a threat to the remaining part of the structure and/or to other structures.

BRIEF SUMMARY

Aspects of the present disclosure relate to an apparatus, a corresponding method, and a corresponding non-transitory computer-readable medium that configure a computer to generate a computer model accurately simulating the amount and distribution of debris from a structure that has at least partially fragmented due to a break up event. To accomplish this goal, one aspect of the present disclosure is directed to a computer configured to generate a debris model for a structure. In this embodiment, the computer comprises a communication interface circuit and processing circuitry operatively connected to the communication interface circuit. The communication interface circuit is configured to communicatively connect the computer to a communications network. The processing circuitry is configured to obtain an output file representing one or more fragments resulting from a simulated break-up of a structure, wherein each fragment comprises a subset of elements of a finite element model (FEM) of the structure, generate one or more debris parts, wherein each debris part represents a fragment and comprises one or more elements indicated as being interconnected in the output file, assign a unique identifier to each debris part, and generate a debris model comprising the one or more debris parts of the structure.

In one aspect, the processing circuitry is further configured to generate a kinematic model predicting motion of each debris part based on the debris model.

In another aspect, the processing circuitry is further configured to generate a computer model predicting a debris field comprising the debris parts based on the debris model.

To generate the one or more debris parts, the processing circuitry is further configured to assign a first element identified in the output file to a first debris part, determine whether one or more additional elements identified in the output file are directly or indirectly connected to the first element; and assign each additional element that is directly or indirectly connected to the first element to the first debris part.

In such aspects, the processing circuitry is configured to determine that an additional element is directly connected to the first element responsive to determining that no intervening elements are between the first element and the additional element.

Alternatively, the processing circuitry is configured to determine that an additional element is indirectly connected to the first element responsive to determining that one or more intervening elements connect the additional element to the first element.

In one aspect, the output file comprises output values associated with a finite element analysis (FEA) performed on the structure to model the simulated break-up of the structure.

In another aspect, the processing circuitry is further configured to determine one or more of a size of the debris part, a speed of the debris part, and a direction of travel of each debris part.

In another aspect, the processing circuitry is further configured to generate a visual representation of the debris model, wherein the visual representation graphically indicates the structure and each debris part, and output the visual representation of the debris model to a display device.

In addition, the present aspects also provide a method of generating a debris model for a structure. The method first calls for obtaining an output file representing one or more fragments resulting from a simulated break-up of a structure, wherein each fragment comprises a subset of elements of a finite element model (FEM) of the structure. The method then calls for generating one or more debris parts, wherein each debris part represents a fragment and comprises one or more elements indicated as being interconnected in the output file, assigning a unique identifier to each debris part, and generating a debris model comprising the one or more debris parts of the structure.

In one aspect, the method further comprises generating a kinematic model predicting motion of each debris part based on the debris model.

In another aspect, the method further comprises generating a computer model predicting a debris field comprising the debris parts based on the debris model.

In another aspect, generating the one or more debris parts comprises assigning a first element identified in the output file to a first debris part, determining whether one or more additional elements identified in the output file are directly or indirectly connected to the first element, and assigning each additional element that is directly or indirectly connected to the first element to the first debris part.

In one aspect, determining that an additional element is directly connected to the first element comprises determining that no intervening elements are between the first element and the additional element.

In one aspect, determining that an additional element is indirectly connected to the first element comprises determining that one or more intervening elements connect the additional element to the first element.

In some aspects, each of the first element and the one or more additional elements assigned to the first debris part share one or more common characteristics.

In one aspect, the output file comprises output values associated with a finite element analysis (FEA) performed on the structure to model the simulated break-up event.

In one aspect, for each of the debris parts, the method further comprises determining, for each debris part, a size of the debris part, a speed of the debris part, and a direction of travel of each debris part.

In one aspect, the method further comprises generating a visual representation of the debris model, wherein the visual representation graphically indicates the structure and each debris part, and outputting the visual representation of the debris model to a display device.

In another aspect, the present disclosure provides a non-transitory computer-readable medium comprising instructions stored thereon that, when executed by processing circuitry of a computing device, configure the computing device to obtain an output file representing one or more fragments resulting from a simulated break-up of a structure, wherein each fragment comprises a subset of elements of a finite element model (FEM) of the structure, generate one or more debris parts, wherein each debris part represents a fragment and comprises one or more elements indicated as being interconnected in the output file, assign a unique identifier to each debris part, and generate a debris model comprising the one or more debris parts of the structure.

BRIEF DESCRIPTION OF THE DRAWINGS

Aspects of the present disclosure are illustrated by way of example and are not limited by the accompanying figures with like references indicating like elements.

DETAILED DESCRIPTION

Aspects of the present disclosure configure a computer to generate a computer model that accurately simulates the amount and distribution of debris from a structure that has at least partially fragmented due to a break up event. In more detail, a computer model of the structure is generated and undergoes a Finite Element Analysis (FEA). By way of example only, the structure being modeled can be an external fuel tank for the space shuttle, and the FEA can be designed to approximate how the fuel tank might break apart upon re-entry into earth's atmosphere given various orbital parameters. Such parameters can include, but are not limited to, the initial speed of the structure, the orientation of the structure, one or more localized strength assumptions about the material(s) comprising the structure, as well as the initial conditions of spin, rotation, temperature, and orbital entry trajectories.

The results of the FEA approximate how the fuel tank might break apart for a given set of orbital parameters. However, due to the number and variety of those parameters, as well as the various combinations of those parameters, the FEA can output hundreds, if not thousands, of different results. Conventionally, to understand the FEA output, a human operator must arduously analyze all of the FEA results and determine which FEA result is most likely to occur. However, this process is very difficult and time consuming, not to mention extremely complex, and is subject to human error.

Aspects of the present disclosure, however, enhance the function of a computer by configuring the computer to identify and separately group the thousands of debris fragments from the results output by the FEA. For example, as described in more detail later, one aspect of the present disclosure takes the FEA results as input, and based on that data, identifies and uniquely groups the fragments into debris parts. Usually, the fragments will comprise the different materials of the structure, with one or more fragments comprising the multiple materials that act differently under different stresses. However, in this aspect, the computer is configured to identify and group the fragments into debris parts without considering the different materials. That is, aspects of the present disclosure ignore the material makeup of the individual fragments. So identified and grouped, aspects of the disclosure configure the computer to generate a debris model comprising the identified debris parts of the structure. Then, based on the debris model, the computer is configured to generate one or more other computer models and provide other data highlighting certain features or issues that may be of interest to an operator.

For example, in one aspect of the disclosure, the computer generates a kinematic model predicting the motion and trajectory of one or more of the debris parts. In another aspect, the computer generates a debris field model that estimates the size and dispersion pattern of the debris parts.

In another aspect, the computer generates a visual representation of the structure. This visual representation, which can be output to a Graphical User Interface (GUI) on a display device, for example, typically includes graphical icons, overlays, visual indicators, or other such graphical markers that are generated by the computer to unambiguously identify, for example, the position, motion, and trajectory of one or more of the debris parts and/or of the remaining structure.

Computers that are configured to function according to one or more aspects of the present disclosure provide benefits that conventional computer systems are not able to provide. For example, a computer configured to function according to the present aspects reduces the volume and complexity of the data comprising the FEA output that is utilized to generate computer models. Because the complexity of the information is reduced, the time and resources required for producing highly accurate computer models is also reduced.

Figure 1:
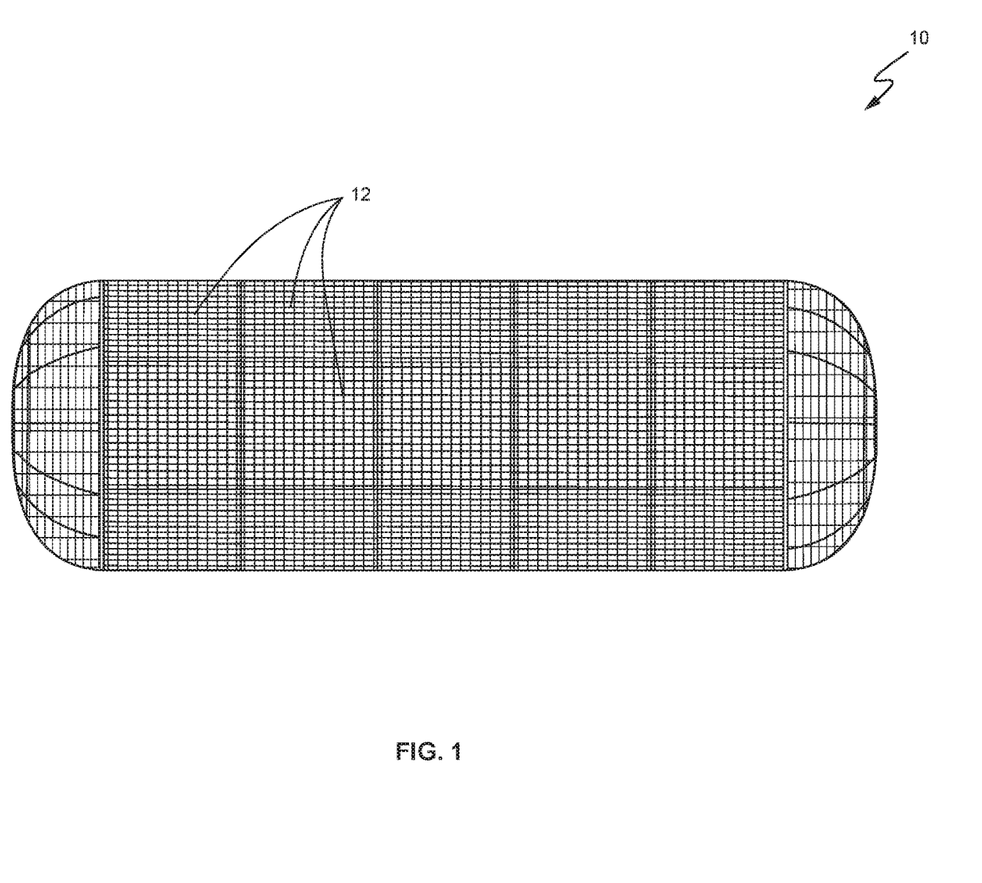
FIG. 1 illustrates the meshed structure of an external fuel tank for processing by a Finite Element Analysis (FEA) before experiencing a break up event according to one aspect of the present disclosure.

Turning now to the drawings, FIG. 1 illustrates a model of an external fuel tank 10 for processing by a Finite Element Analysis (FEA). Any program known in the art can be utilized to perform the FEA on tank 10; however, one embodiment of the present disclosure utilizes LS-DYNA developed by Livermore Software Technology Corporation. Additionally, those of ordinary skill in the art will realize that the specific mention of tank 10 herein is for illustrative purposes only, and that aspects of the present disclosure can be utilized for any structure in the physical domain that can be modeled and analyzed using a FEA.

As seen in FIG. 1, the software being used to perform the FEA hypothetically partitions tank 10 into a plurality of interconnected elements 12. These interconnected elements 12, which may be as large or as small as needed or desired, are typically referred to as the "mesh" of tank 10. As seen in more detail later, each element 12 connects to at least one other element 12 at a plurality of "nodes." A "node" is a coordinate location on an element where the degrees of freedom (DOF) of the element are defined. The results of the FEA are typically given at these nodes. That is, the kinematic variables are given at the nodes, but the computed stresses and strains are defined for the entire element.

FIG. 1 illustrates tank 10 as it is modeled prior to experiencing a "break up" event. Such break up events are incidents that cause a structure or part of a structure, such as tank 10, to at least partially fragment, divide, or disintegrate, for example. While not an exhaustive list, break up events can include, but are not limited to, occasions where tank 10 is struck by a projectile, or where tank 10 is subjected to an explosion (e.g., either inside the tank 10 or at or near its surface), or when tank 10 re-enters earth's atmosphere. The software performing the FEA takes the modeled tank 10 and applies one or more various parameters (e.g., the initial speed of tank 10, the orientation of tank 10, one or more localized strength assumptions about the material(s) comprising tank 10, as well as the initial conditions of spin, rotation, temperature, and orbital entry trajectory of tank 10.

Figure 2:
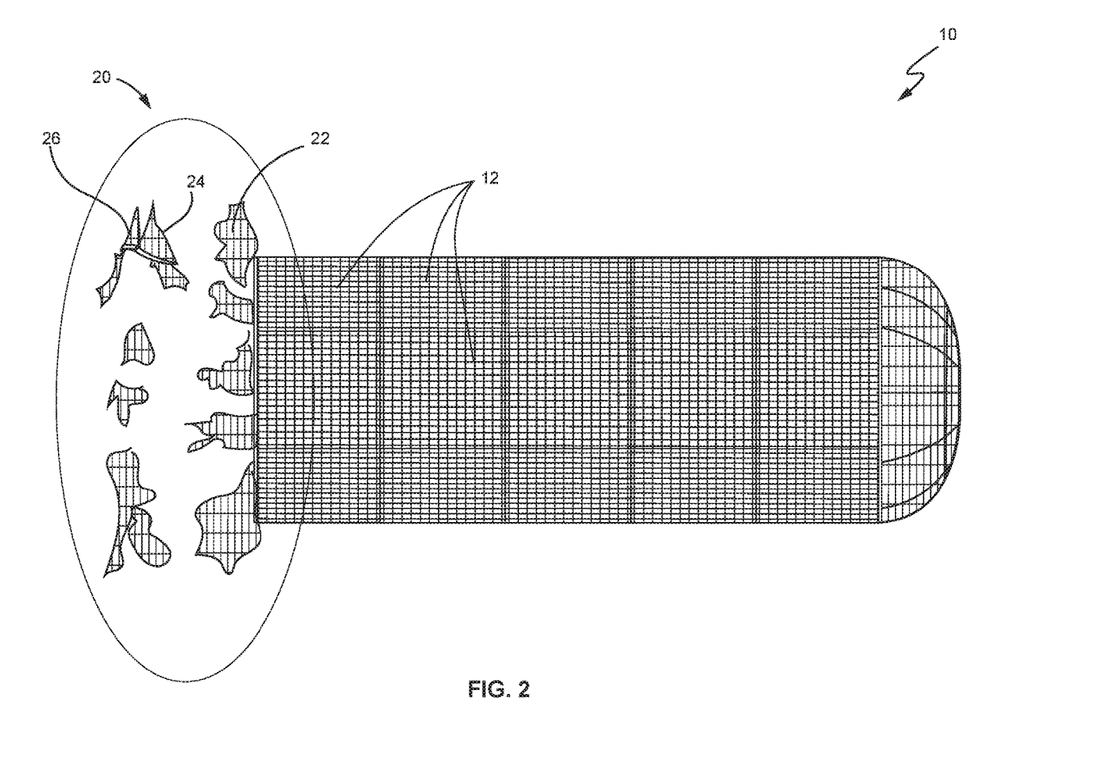
FIG. 2 illustrates the meshed structure of the external fuel tank after experiencing a break up event according to one aspect of the present disclosure.
Figure 3:
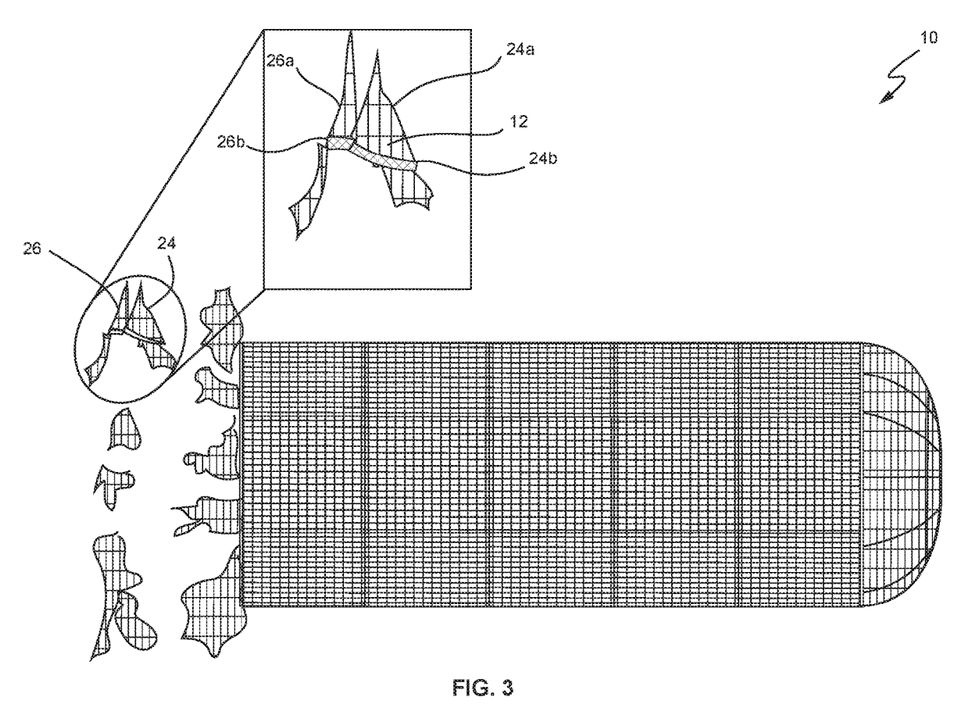
FIG. 3 illustrates the meshed structure of the external fuel tank after experiencing break up event, as well as a close up view of some of the debris fragments, according to one aspect of the present disclosure.
Figure 4:
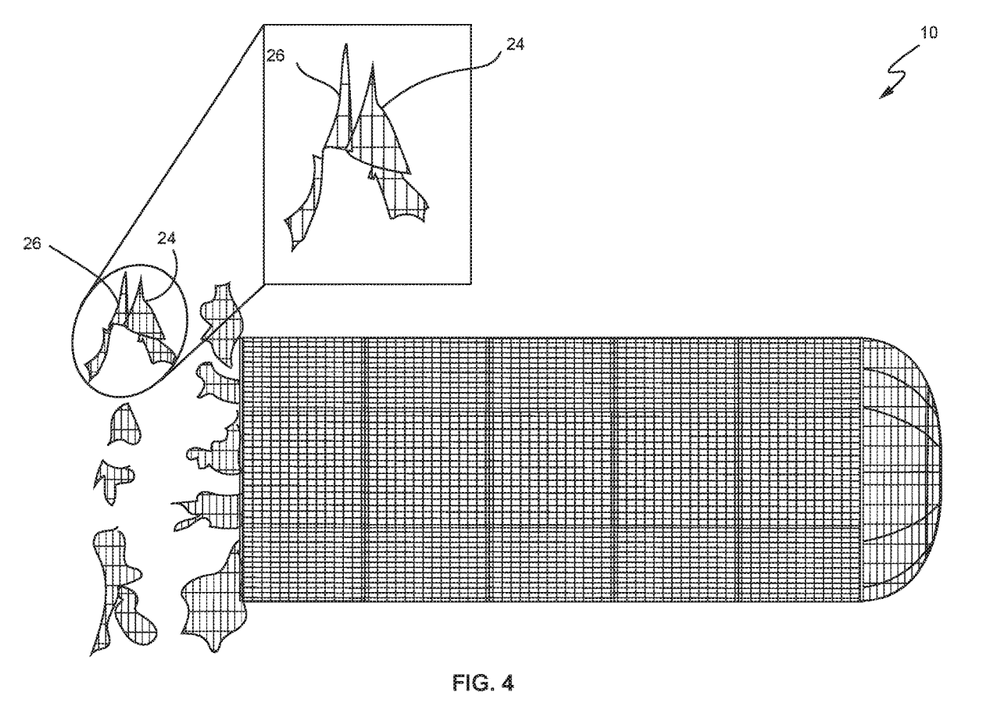
FIG. 4 illustrates the meshed structure of the fragmented external fuel tank, as well as a close up view of some of the fragments, after having been processed according to one aspect of the present disclosure.

FIGS. 2-4 illustrate the results of an FEA according to one aspect of the present disclosure in which tank 10 has experienced a break up event. As seen in these figures, the FEA results for a given set of parameters indicate that a rear portion 20 of tank 10 at least partially disintegrates into a plurality of arbitrary debris fragments 22, 24, 26. As best seen in the close-up in FIG. 3, some of the fragments 24, 26 are themselves comprised of two or more different materials 24a, 24b, 26a, 26b. For example, the fragments of debris can be part of an area of the tank 10 that is constructed of the different materials. Regardless of their compositional makeup, however, each of the debris fragments 22, 24, 26 are characterized as to their individual sizes, shapes, velocities, and directions of motion, for example, in order to generate additional accurate computer models. As stated above, such models include, but are in no way limited to, kinematic models that predict the motion and trajectory of the debris fragments, a debris field model estimating the size and dispersion pattern of the debris fragments, and a visual representation of tank 10 that can be output to a display device for viewing by an operator.

To characterize the debris fragments, aspects of the present disclosure first identify each individual fragment (e.g., fragments 24, 26) in the model by analyzing the elements 12 of each fragment 24, 26. In particular, aspects of the disclosure analyze the results output by one or more of the FEAs and group interconnected elements without concern for the material composition indicated by the elements 12. So grouped, each debris fragment is assigned a unique identifier and stored in memory as a debris model. Thereafter, the debris model is utilized to generate one or more of a kinematic model, a debris field model, and a visual representation of the tank 10 showing debris fragments 22, 24, 26.

Figure 5A:
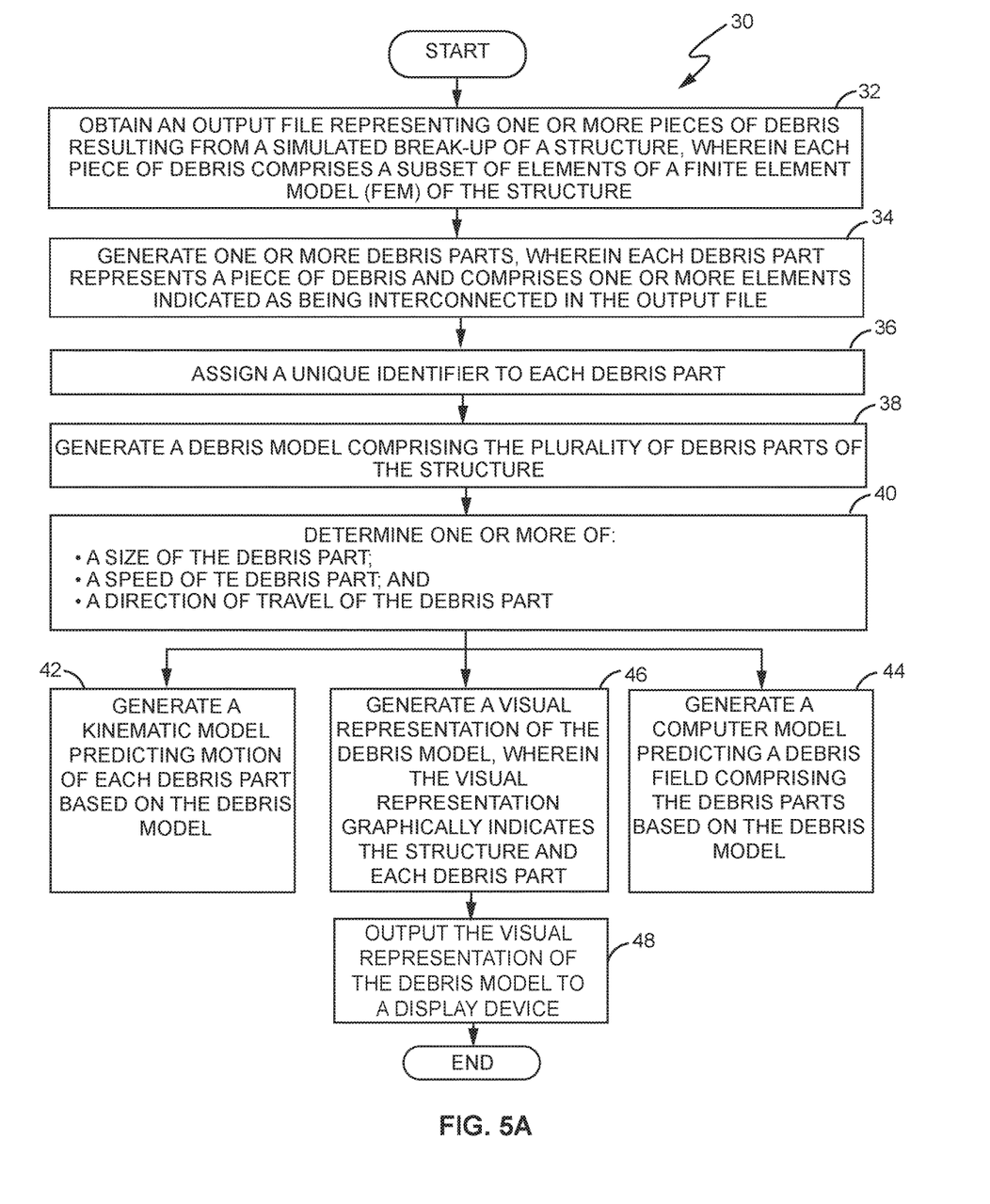
FIG. 5A is a flow diagram illustrating a method of generating a computer model of a structure that has experienced a break up event according to one aspect of the present disclosure.
Figure 5B:
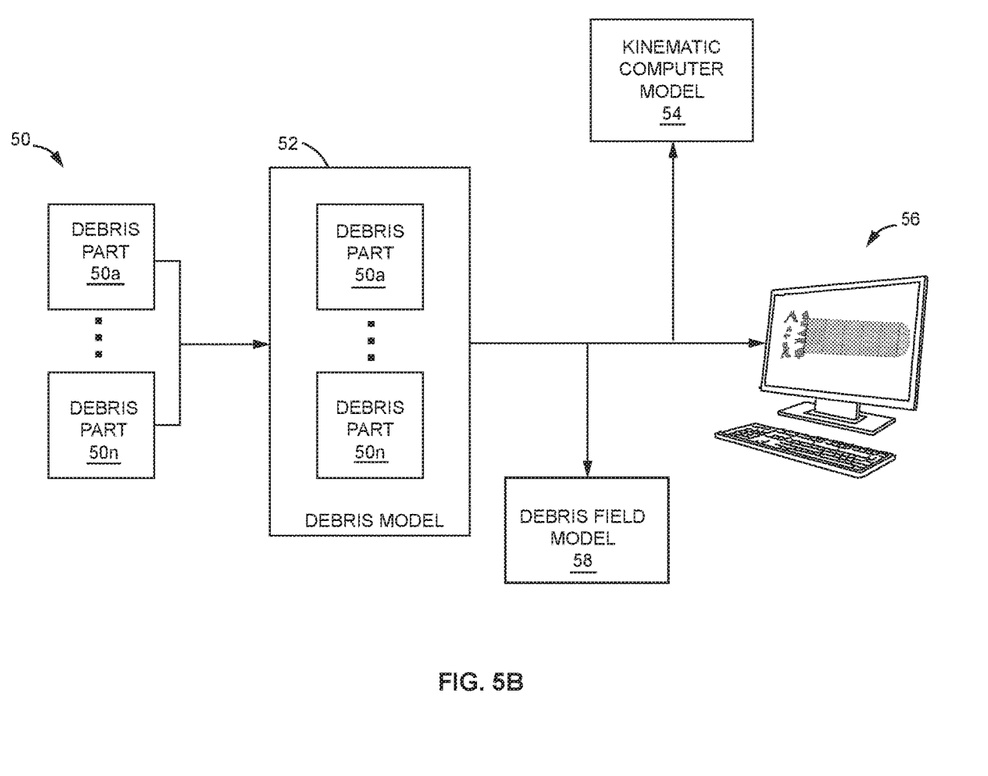
FIG. 5B is a schematic block diagram illustrating the relationship between the debris parts, the debris model, and the computer models generated using the method of FIG. 5A.

FIG. 5A is a flow diagram illustrating a method 30 of generating one or more computer models for tank 10 after tank 10 has experienced a break up event, according to one aspect of the present disclosure. FIG. 5B is a schematic block diagram illustrating the relationship existing between one or more debris parts 50a . . . 50n (collectively, debris parts 50), a debris model generated from the debris parts 50, and the one or more computer models that are generated based on the information and data comprising the debris model 52.

As seen in FIG. 5A, method 30 begins with a computer device obtaining an output file (box 32). The output file can be obtained from the memory of the computer, or from some other storage location. Regardless from where it is obtained, however, the output file comprises data representing the structure (e.g. tank 10) and one or more debris fragments (e.g., fragments 22, 24, 26) resulting from the simulated break-up of tank 10. Each debris fragment 22, 24, 26 comprises a subset of elements of an FEM of tank 10. After obtaining the output file, the computer generates one or more debris parts 50 (box 34). Each debris part 50a . . . 50n comprises information representing a corresponding debris fragment 22, 24, 26, and comprises one or more elements 12 that are indicated as being interconnected in the output file. The computer then assigns a unique identifier to each debris part 50 (box 36), and generates a debris model 52 comprising the debris parts 50 (box 38). In one aspect, the computer also determines one or more characteristics of each debris part 50 and includes that information in the debris model 52 (box 40). Such characteristics include, but are not limited to, data indicating a size of each debris part 50, a speed of each debris part 50, and a direction of travel of the debris part 50 relative to some reference point.

Based on the information and data contained in the debris model 52, the computer is configured to generate other computer models. For example, in one aspect, the computer is configured to generate a kinematic model 54 predicting the motion and trajectory of one or more of the debris parts 50 (box 42). In another aspect, the computer is configured to generate a debris field model 58 that estimates the size and dispersion pattern of the debris parts 50 (box 44) along a surface, such as the ground. In yet another aspect, the computer is configured to generate a visual representation 56 of tank 10 depicting what tank 10 may look like after it has experienced a break-up event (box 46). In this aspect, the visual representation graphically indicates the tank 10 and each debris part 50, and is output to a Graphical User Interface (GUI) on a display device (box 48). Typically, the generated visual representation 56 includes graphical icons, overlays, visual indicators, and/or other such graphical markers that identify the tank 10, each of the debris parts 50, and the position, motion, size, speed, mass, and trajectory of one or more of the debris parts and/or the remaining structure.

Figure 6:
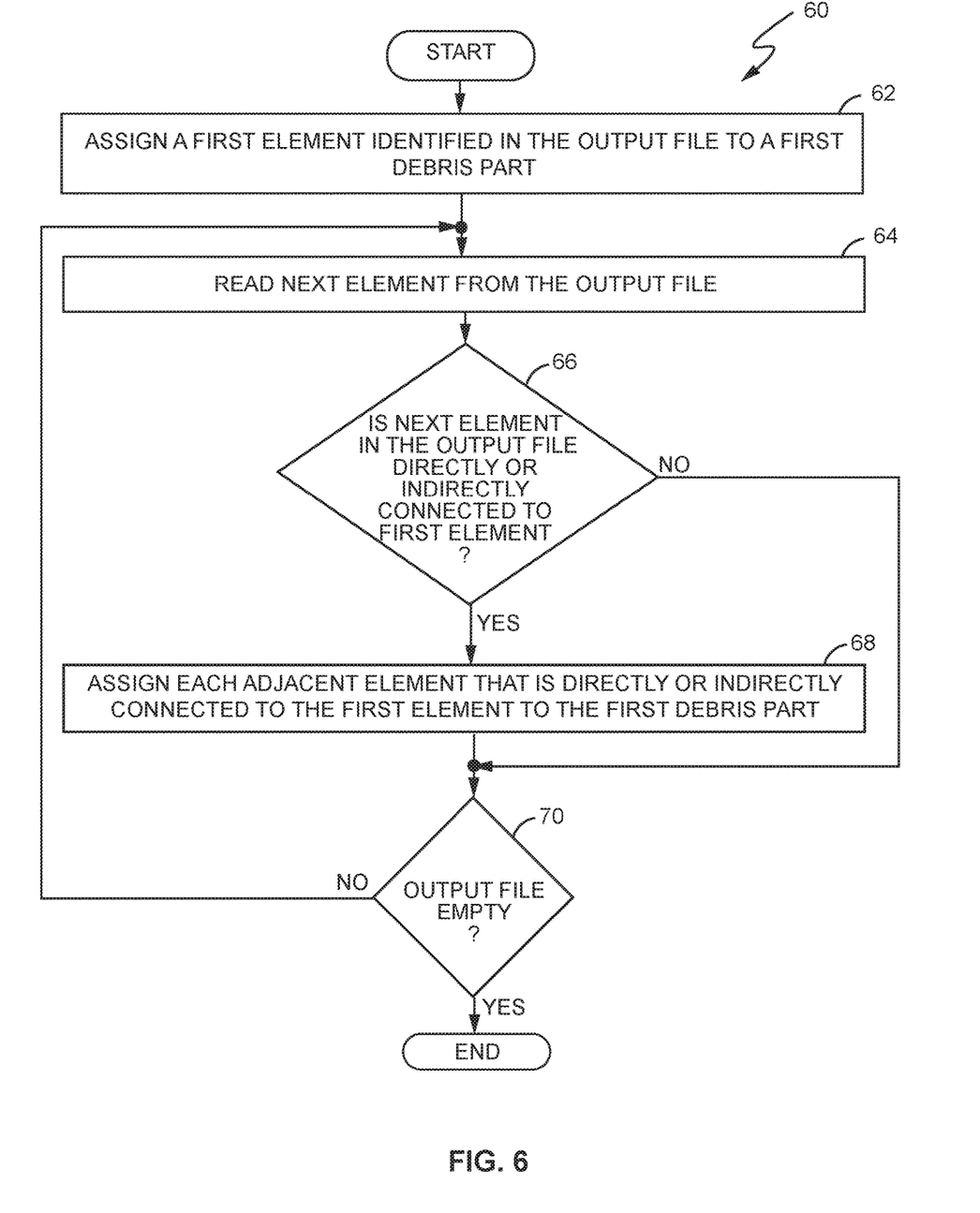
FIG. 6 is a flow diagram illustrating a method of processing the debris fragments of a structure according to one aspect of the present disclosure.

FIG. 6 is a flow diagram illustrating a method 60 of processing the debris fragments 22, 24, 26 into debris parts 50 according to one aspect of the present disclosure. As seen in FIG. 6, the output file obtained by the computer identifies each of the elements 12 in the model of tank 10. Given this file, method 60 begins with reading a first element 12 from the output file, and assigning that element 12 to a first debris part 50a (box 62). Method 60 then reads the next element 12 from the output file (box 64), and determines whether that next element 12 is directly or indirectly connected to the first element 12 (box 66). If it is determined that the next element 12 is directly or indirectly connected to the first element 12, method 60 assigns that element 12 to the first debris part 50a (box 68). However, if the next element 12 read from the output file is not directly or indirectly connected to the first element 12, method 60 does not assign that element to the first debris part 50a, but instead, checks to see if the output file is empty (box 70). So long as the output file is not empty, this process continues with method 60 assigning all elements 12 in the output file that are directly or indirectly connected to the first element 12 to the first debris part 50a.

It should be noted that method 60 of FIG. 6 merely shows the method with respect to assigning elements to the first debris part 50a. However, those of ordinary skill in the art should readily appreciate that this is for illustrative purposes only. A computer configured according to the present aspects repeats the process illustrated in method 60 until all elements 12 in the output file are assigned to a corresponding debris part 50. Thus, responsive to determining that an element 12 read from the output file is not directly or indirectly connected to the first element, the computer will know that the element 12 is actually part of another debris fragment 22, 24, 26 that is spatially separated from the other debris fragments 22, 24, 26. In these situations, the computer will simply assign that element 12 to another, different debris part 50 (e.g., such as a second debris part). All other elements read from the output file that are directly or indirectly connected to the element 12 assigned to the second debris part are then assigned to the second debris part.

Figure 7A:
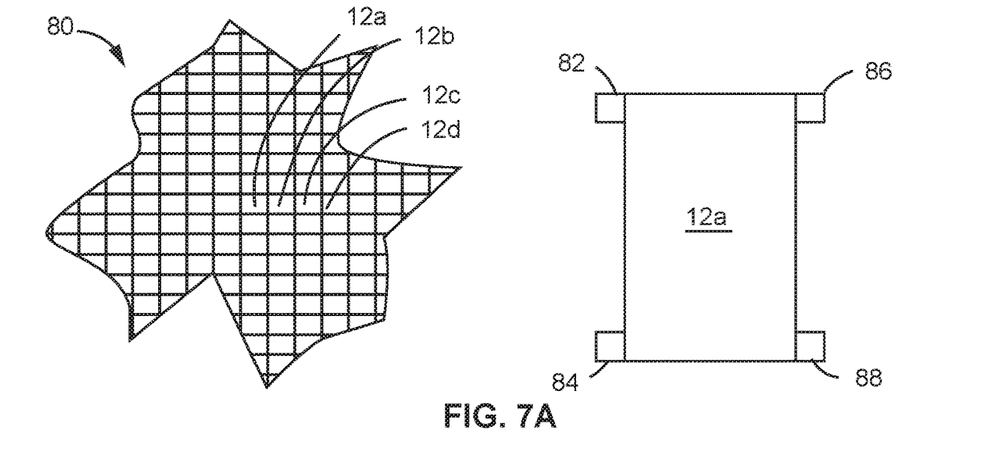
FIGS. 7A-7C illustrate elements processed according to the method seen in FIG. 6 according to one embodiment of the present disclosure.
Figure 7B:
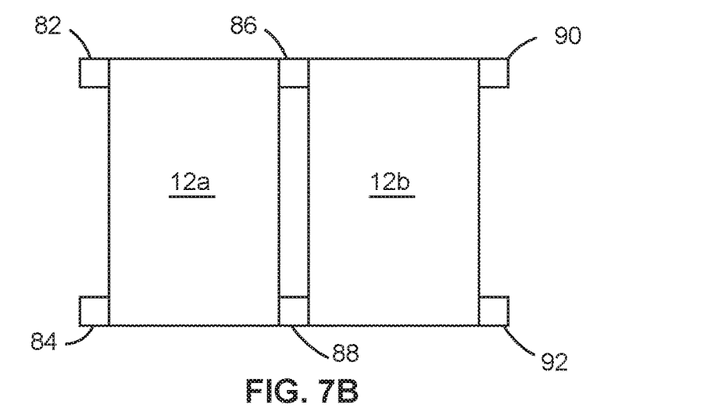
Figure 7C:
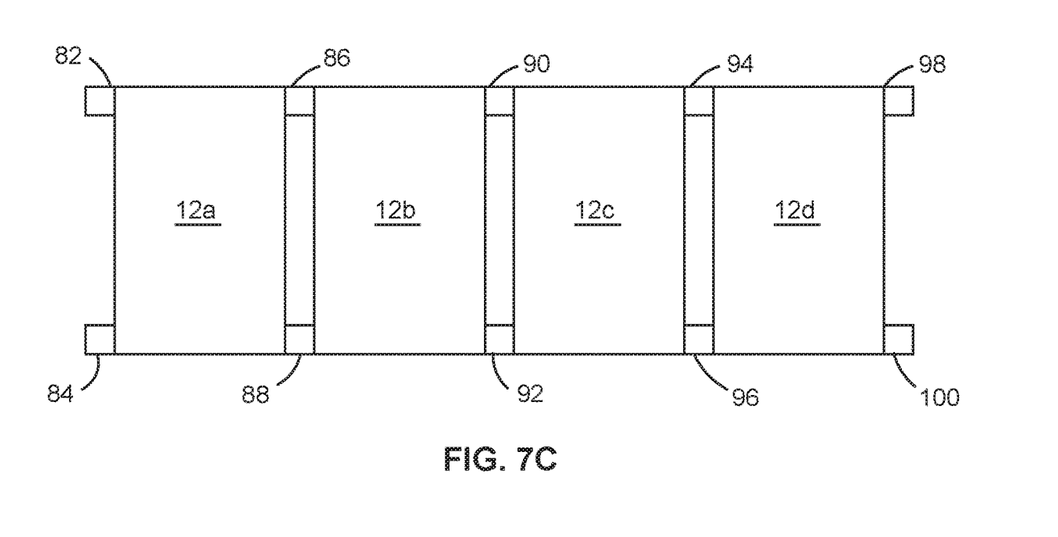

FIGS. 7A-7C illustrate elements 12 processed according to method 60 in one aspect of the present disclosure. FIG. 7A illustrates a debris fragment 80 hypothetically partitioned into a plurality of elements 12a, 12b, 12c, and 12d. Each element 12 seen in FIG. 7A, such as element 12a, has a plurality of nodes 82, 84, 86, 88. As previously stated, nodes 82, 84, 86, 88 are coordinate locations on the element 12a where the DOF of the element 12a are defined. The results of an FEA are typically given at these nodes 82, 84, 86, 88.

FIG. 7B illustrates an aspect in which element 12a includes nodes 82 and 84, and element 12b includes nodes 90 and 92. Elements 12a and 12b share nodes 86 and 88. Thus, elements 12a and 12b are considered to be "directly connected" to each other. That is, there are no intervening elements disposed between elements 12a and 12b. FIG. 7C illustrates a situation in which some elements are "directly connected" to element 12a, while other elements are "indi-rectly connected" to element 12a. For example, element 12a includes nodes 82 and 84, and element 12d includes nodes 98 and 100. Element 12b, as described above, is directly connected to element 12a because both elements 12a and 12b share nodes 86, 88. Element 12c is directly connected to element 12b because both elements 12b and 12c share nodes 90 and 92. Element 12d is directly connected to element 12c because both elements 12c and 12d share nodes 94 and 96. Elements 12c and 12d, however, are indirectly connected to element 12a. This is because element 12b is an intervening element between elements 12a and 12c, 12d.

Figure 8:
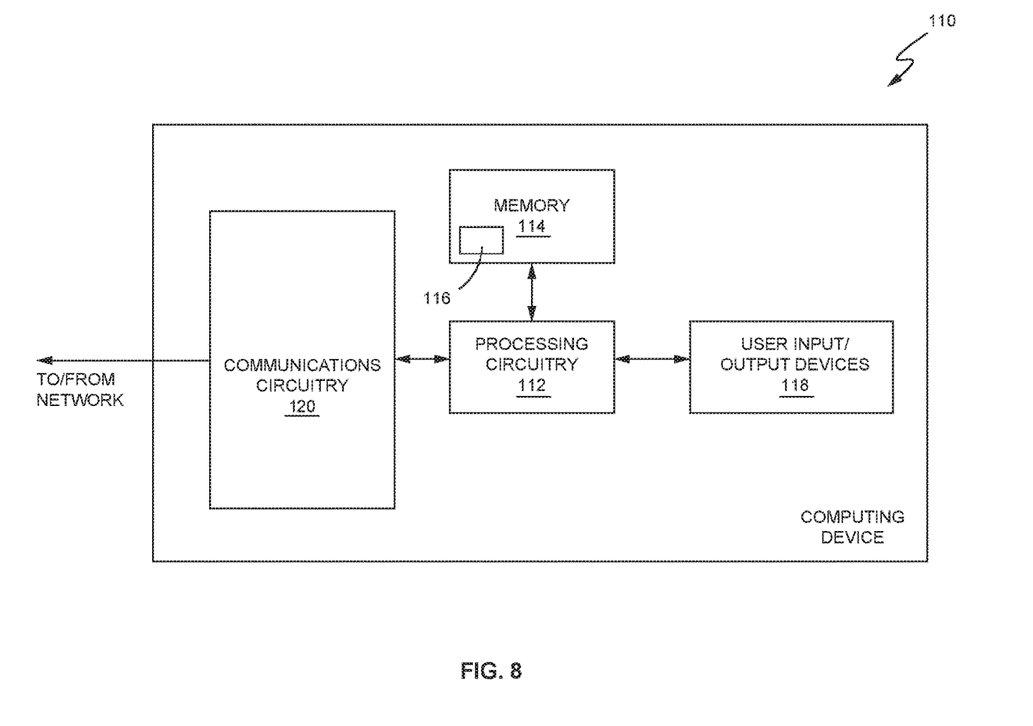
FIG. 8 is a schematic block diagram illustrating some components of a computing device configured to function according to one aspect of the present disclosure.

FIG. 8 is a schematic block diagram illustrating some components of a computing device 110 configured to generate the computer models as previously described. In particular, computing device 110 comprises processing circuitry 112 communicatively coupled to a memory circuit 114 that stores one or more control programs 116, one or more user input/output devices 118 (e.g., a keyboard, a mouse, one or more display devices, etc.), and communication circuitry 120.

According to various aspects of the present disclosure, processing circuitry 112 comprises one or more microprocessors, microcontrollers, hardware circuits, discrete logic circuits, hardware registers, digital signal processors (DSPs), field-programmable gate arrays (FPGAs), application-specific integrated circuits (ASICs), or a combination thereof. In one such aspect, processing circuitry 112 includes programmable hardware capable of executing software instructions stored, e.g., as a machine-readable computer control program 116 in memory circuit 114.

More particularly, processing circuitry 112 is configured to execute control program 116 to obtain an output file representing one or more fragments resulting from a simulated break-up of a structure, wherein each fragment comprises a subset of elements of a finite element model (FEM) of the structure, generate one or more debris parts, wherein each debris part represents a fragment and comprises one or more elements indicated as being interconnected in the output file, assign a unique identifier to each debris part, and generate a debris model comprising the one or more debris parts of the structure, as previously described. Additionally, in one or more aspects, processing circuitry 112 is also configured to generate one or more of a kinematic model predicting motion of each debris part based on the debris model, a computer model predicting a debris field comprising the debris parts based on the debris model, and a visual representation of the debris model for output to a display device graphically indicating the structure and each debris part.

Memory circuit 114 comprises any non-transitory machine-readable storage media known in the art or that may be developed, whether volatile or non-volatile, including (but not limited to) solid state media (e.g., SRAM, DRAM, DDRAM, ROM, PROM, EPROM, flash memory, solid state drive, etc.), removable storage devices (e.g., Secure Digital (SD) card, miniSD card, microSD card, memory stick, thumb-drive, USB flash drive, ROM cartridge, Universal Media Disc), fixed drive (e.g., magnetic hard disk drive), or the like, individually or in any combination. As seen in FIG. 8, memory circuit 114 comprises circuitry configured to store control program 116. In some aspects, memory circuit 104 also stores the output files obtained by processing circuitry 112.

The User Input/Output (I/O) devices 118 comprise any device known in the art that allow a user to interact with the computing device 110. Such devices can include, but are not limited to, microphones, display devices (such as a Liquid Crystal Display (LCD) and/or a Light Emitting Diode (LED) display for presenting visual information to a user), keyboards, a pointer device, such as a mouse, and the like. In accordance with the present disclosure, the computer models that are generated according to the present aspects can be output by processing circuitry 112 to a display device.

Communications circuitry 120 comprises circuitry configured to control the input and output (I/O) data paths of the computing device 110. The I/O data paths include data paths for exchanging signals with other computers and mass storage devices over a communications network (not shown). Such signals include, but are not limited to, those that are needed to obtain the output files and generate the computer models, as previously described. Such storage locations include, for example, databases. In some aspects, communications circuitry 120 comprises an ETHERNET card configured to communicate signals and data with one or more remote devices via one or more communications networks (not shown).

Figure 9:
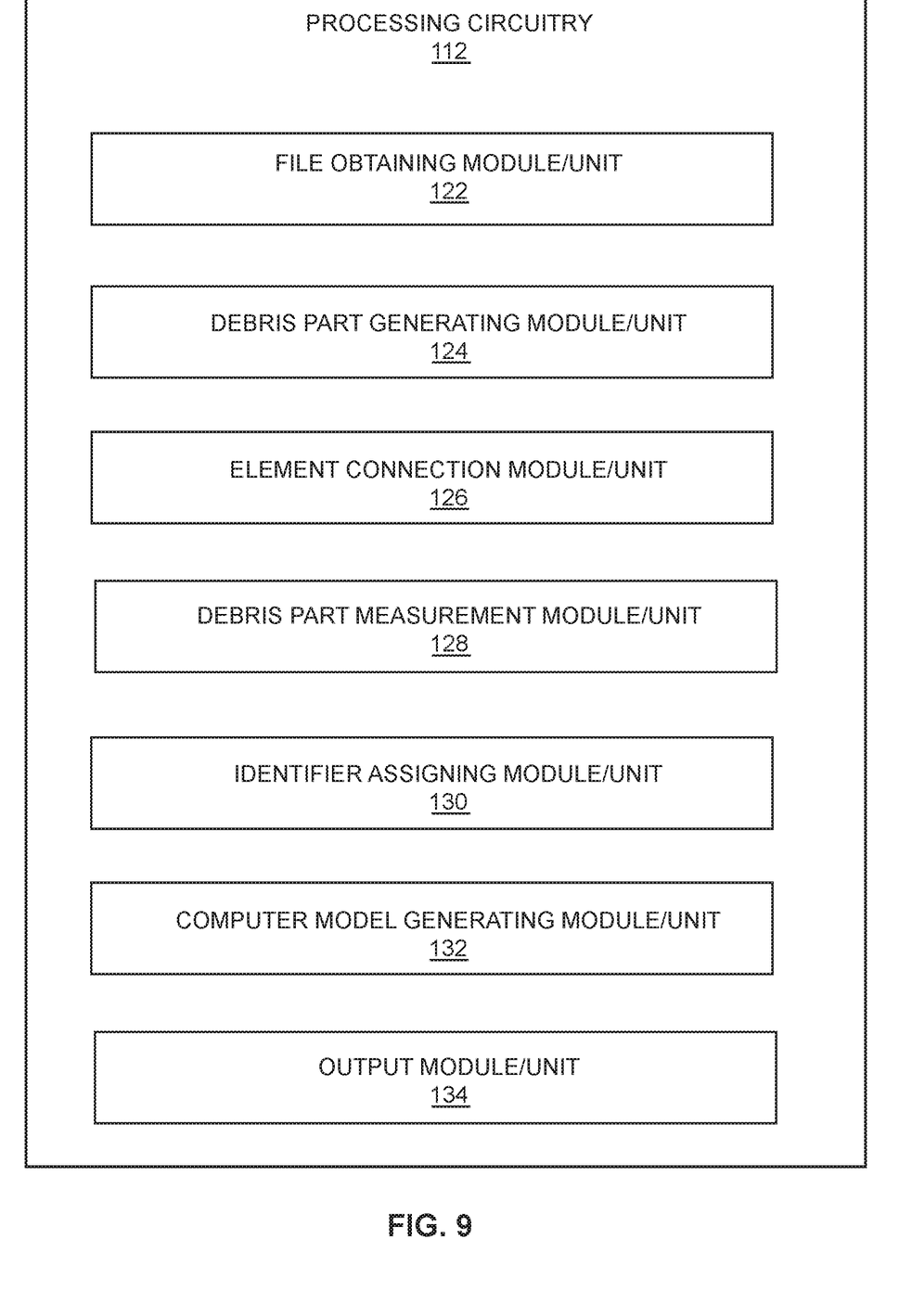
FIG. 9 is a block diagram illustrating example processing circuitry configured to function according to one or more aspects of the present disclosure.

FIG. 9 is a schematic block diagram illustrating processing circuitry 112 implemented according to different hardware units and software modules (e.g., as control program 116 stored in memory circuit 114) according to one aspect of the present disclosure. As seen in FIG. 9, processing circuitry 112 implements a file obtaining module/unit 122, a debris part generating module/unit 124, an element connection module/unit 126, a debris part measurement module/unit 128, an identifier assigning module/unit 130, a computer model generating module/unit 132, and an output module/unit 134.

The file obtaining module/unit 122 is configured to obtain the output files output by the FEA, as previously described. The debris part generating module/unit 124 is configured to generate the debris parts to which the elements 12 are assigned, and further, to assign the elements to their corresponding debris parts. The element connection module/unit 126 is configured to determine whether any given element 12 in the results of an FEA analysis is directly or indirectly connected to another element 12. The debris part measurement module/unit 128 is configured to measure the various characteristics of the debris parts, such as the speed, direction of motion, size, and the like. The identifier assigning module/unit 130 is configured to assign a given element to an appropriate debris part, as previously described. The computer model generating module/unit 132 is configured to generate one or more of the computer models previously described, and the output module/unit 134 is configured to output the models, and any other information associated with the models, to a display device for display to a user.

Figure 10:
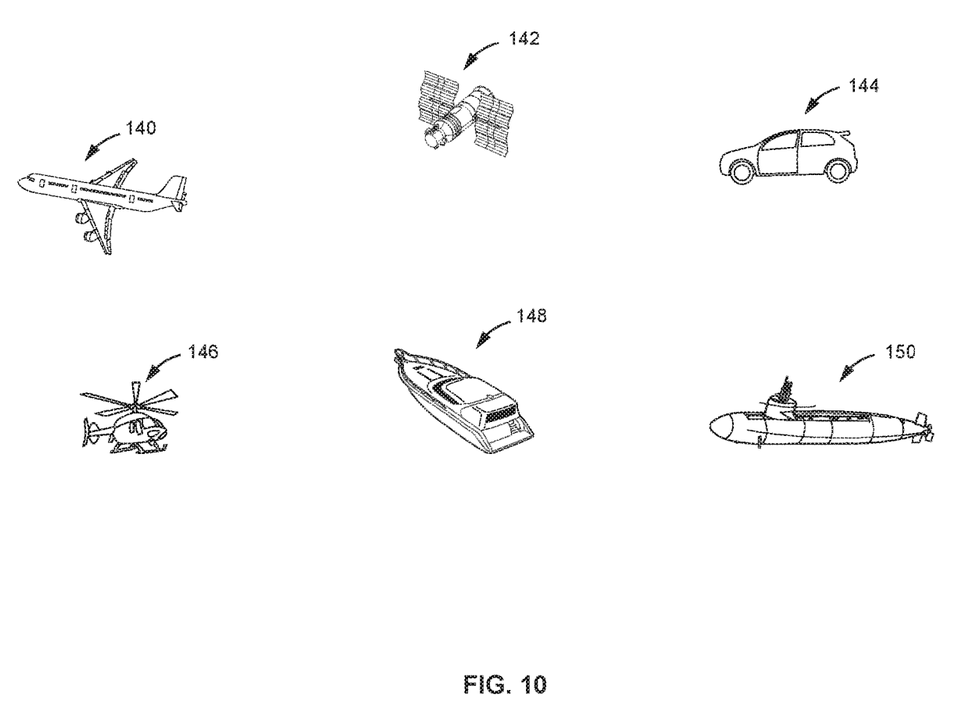
FIG. 10 illustrates some example vehicles that can be modeled according to aspects of the present disclosure.

It should be noted that the previous aspects describe the present disclosure in the context of an external fuel tank 10 for a space shuttle. However, this is for illustrative purposes only. Aspects of the present disclosure are equally as suitable for use in connection with any type of physical structure that can be modeled and analyzed with a FEA. As seen in FIG. 10, for example, such structures include, but are not limited to, aircraft 140, spacecraft 142, automobiles 144, rotorcraft 146 such as helicopters, surface craft 148 such as boats, and submersible craft 150 such as submarines.

Aspects of the present disclosure further include various methods and processes, as described herein, implemented using various hardware configurations configured in ways that vary in certain details from the broad descriptions given above. For instance, one or more of the processing functionalities discussed above may be implemented using dedicated hardware, rather than a microprocessor configured with program instructions, depending on, e.g., the design and cost tradeoffs for the various approaches, and/or system-level requirements.

Thus, the foregoing description and the accompanying drawings represent non-limiting examples of the methods and apparatus taught herein. As such, the aspects of the present disclosure are not limited by the foregoing description and accompanying drawings. Instead, the aspects of the present disclosure are limited only by the following claims and their legal equivalents.

What is claimed is:

1. A computer configured to generate a debris model for a structure, the computer comprising:
a memory circuit; and
processing circuitry operatively connected to the memory circuit and configured to:
obtain an output file representing one or more fragments of a structure resulting from a simulated break-up of the structure, wherein each fragment comprises a subset of elements of a finite element model (FEM) of the structure;
generate one or more debris parts from the one or more fragments represented in the output file, wherein each debris part represents a fragment and comprises one or more elements indicated as being interconnected in the output file;
assign a unique identifier to each debris part; and
generate a debris model comprising the one or more debris parts of the structure.

2. The computer of claim 1 wherein the processing circuitry is further configured to generate a kinematic model predicting motion of each debris part based on the debris model.

3. The computer of claim 1 wherein the processing circuitry is further configured to generate a computer model predicting a debris field comprising the debris parts based on the debris model.

4. The computer of claim 1 wherein to generate the one or more debris parts, the processing circuitry is further configured to:
assign a first element identified in the output file to a first debris part;
determine whether one or more additional elements identified in the output file are directly or indirectly connected to the first element; and
assign each additional element that is directly or indirectly connected to the first element to the first debris part.

5. The computer of claim 4 wherein the processing circuitry is configured to determine that an additional element is directly connected to the first element responsive to determining that no intervening elements are between the first element and the additional element.

6. The computer of claim 4 wherein the processing circuitry is configured to determine that an additional element is indirectly connected to the first element responsive to determining that one or more intervening elements connect the additional element to the first element.

7. The computer of claim 1 wherein the output file comprises output values associated with a finite element analysis (FEA) performed on the structure to model the simulated break-up of the structure.

8. The computer of claim 1 wherein, for each of the one or more debris parts, the processing circuitry is further configured to determine one or more of:
a size of the debris part;
a speed of the debris part; and
a direction of travel of each debris part.

9. The computer of claim 1 wherein the processing circuitry is further configured to:
   generate a visual representation of the debris model, wherein the visual representation graphically indicates the structure and each debris part; and
   output the visual representation of the debris model to a display device.

10. A method of generating a debris model for a structure, the method comprising:
   obtaining an output file representing one or more fragments of a structure resulting from a simulated break-up of the structure, wherein each fragment comprises a subset of elements of a finite element model (FEM) of the structure;
   generating one or more debris parts from the one or more fragments represented in the output file, wherein each debris part represents a fragment and comprises one or more elements indicated as being interconnected in the output file;
   assigning a unique identifier to each debris part; and
   generating a debris model comprising the one or more debris parts of the structure.

11. The method of claim 10 further comprising generating a kinematic model predicting motion of each debris part based on the debris model.

12. The method of claim 10 further comprising generating a computer model predicting a debris field comprising the debris parts based on the debris model.

13. The method of claim 10 wherein generating the one or more debris parts comprises:
   assigning a first element identified in the output file to a first debris part;
   determining whether one or more additional elements identified in the output file are directly or indirectly connected to the first element; and
   assigning each additional element that is directly or indirectly connected to the first element to the first debris part.

14. The method of claim 13 wherein determining that an additional element is directly connected to the first element comprises determining that no intervening elements are between the first element and the additional element.

15. The method of claim 13 wherein determining that an additional element is indirectly connected to the first element comprises determining that one or more intervening elements connect the additional element to the first element.

16. The method of claim 13 wherein each of the first element and the one or more additional elements assigned to the first debris part share one or more common characteristics.

17. The method of claim 10 wherein the output file comprises output values associated with a finite element analysis (FEA) performed on the structure to model the simulated break-up of the structure.

18. The method of claim 10 wherein the method further comprises determining for each debris part, one or more of:
   a size of the debris part;
   a speed of the debris part; and
   a direction of travel of the debris part.

19. The method of claim 10 further comprising:
   generating a visual representation of the debris model, wherein the visual representation graphically indicates the structure and each debris part; and
   outputting the visual representation of the debris model to a display device.

20. A non-transitory computer-readable medium comprising instructions stored thereon that, when executed by processing circuitry of a computing device, configure the computing device to:
   obtain an output file representing one or more fragments of a structure resulting from a simulated break-up of the structure, wherein each fragment comprises a subset of elements of a finite element model (FEM) of the structure;
   generate one or more debris parts from the one or more fragments represented in the output file, wherein each debris part represents a fragment and comprises one or more elements indicated as being interconnected in the output file;
   assign a unique identifier to each debris part; and
   generate a debris model comprising the one or more debris parts of the structure.

* * * * *